G. C. JAMES.
CHICKEN PERCH.
APPLICATION FILED APR. 13, 1909.

974,386.

Patented Nov. 1, 1910.
2 SHEETS—SHEET 1.

Witnesses

Inventor
G. C. James
By ........., Attorneys.

G. C. JAMES.
CHICKEN PERCH.
APPLICATION FILED APR. 13, 1909.
974,386.
Patented Nov. 1, 1910.
2 SHEETS—SHEET 2.
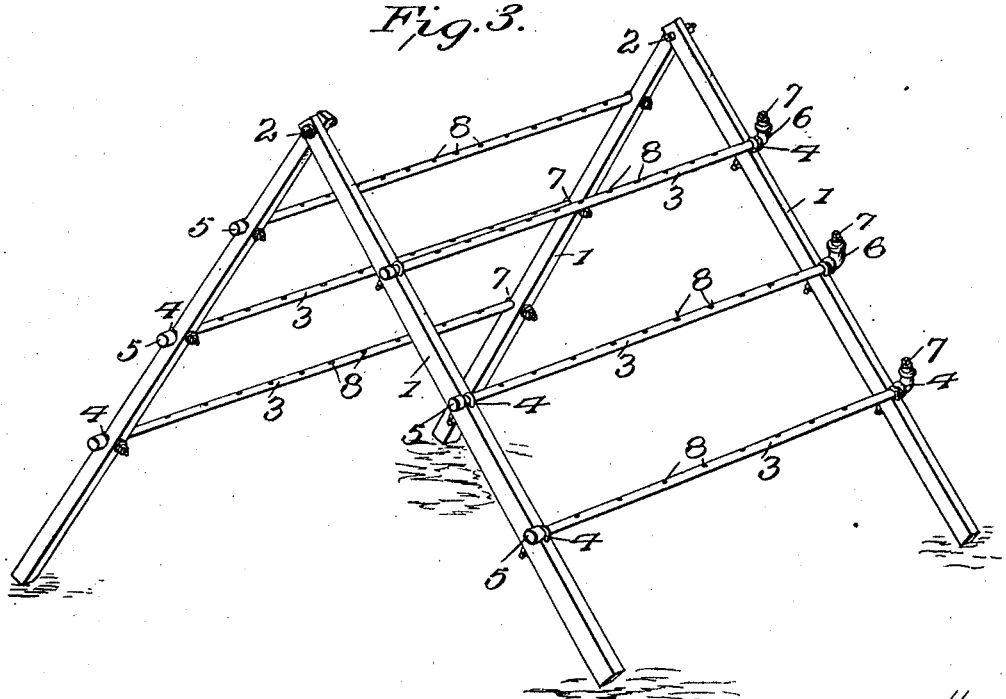
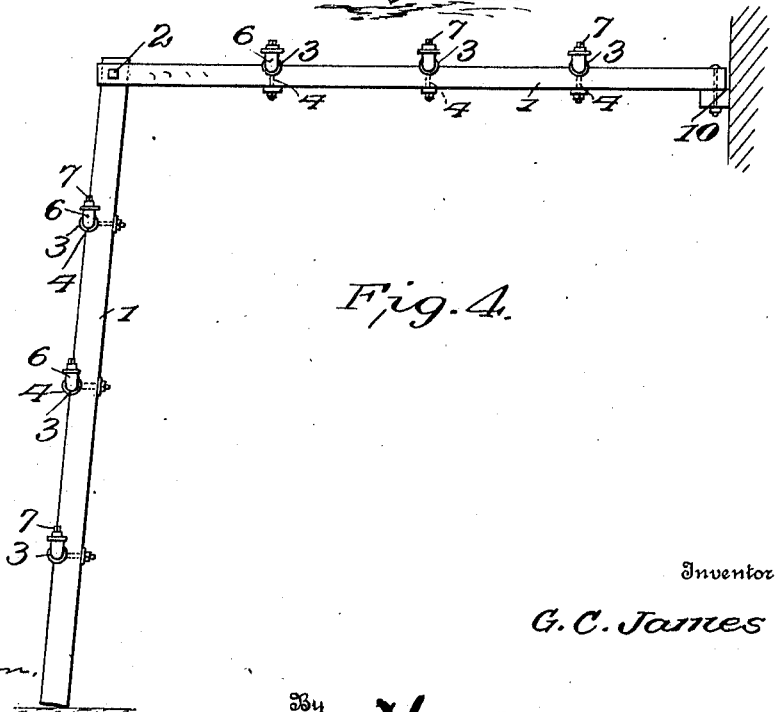

UNITED STATES PATENT OFFICE.

GEORGE C. JAMES, OF FAIRMONT, NEBRASKA.

CHICKEN-PERCH.

974,386. Specification of Letters Patent. Patented Nov. 1, 1910.

Application filed April 13, 1909. Serial No. 489,561.

*To all whom it may concern:*

Be it known that I, GEORGE C. JAMES, citizen of the United States, residing at Fairmont, in the county of Fillmore and State of Nebraska, have invented certain new and useful Improvements in Chicken-Perches, of which the following is a specification.

In the housing of chickens and other fowls, it is well known that difficulty is experienced in providing sanitary perches and such as will prevent the fowls from becoming infested with vermin.

This invention has for its object to provide a perch simple in construction and which will carry a disinfectant, the vapors of which on coming in contact with the fowls will insure their sanitary condition.

Figure 1:
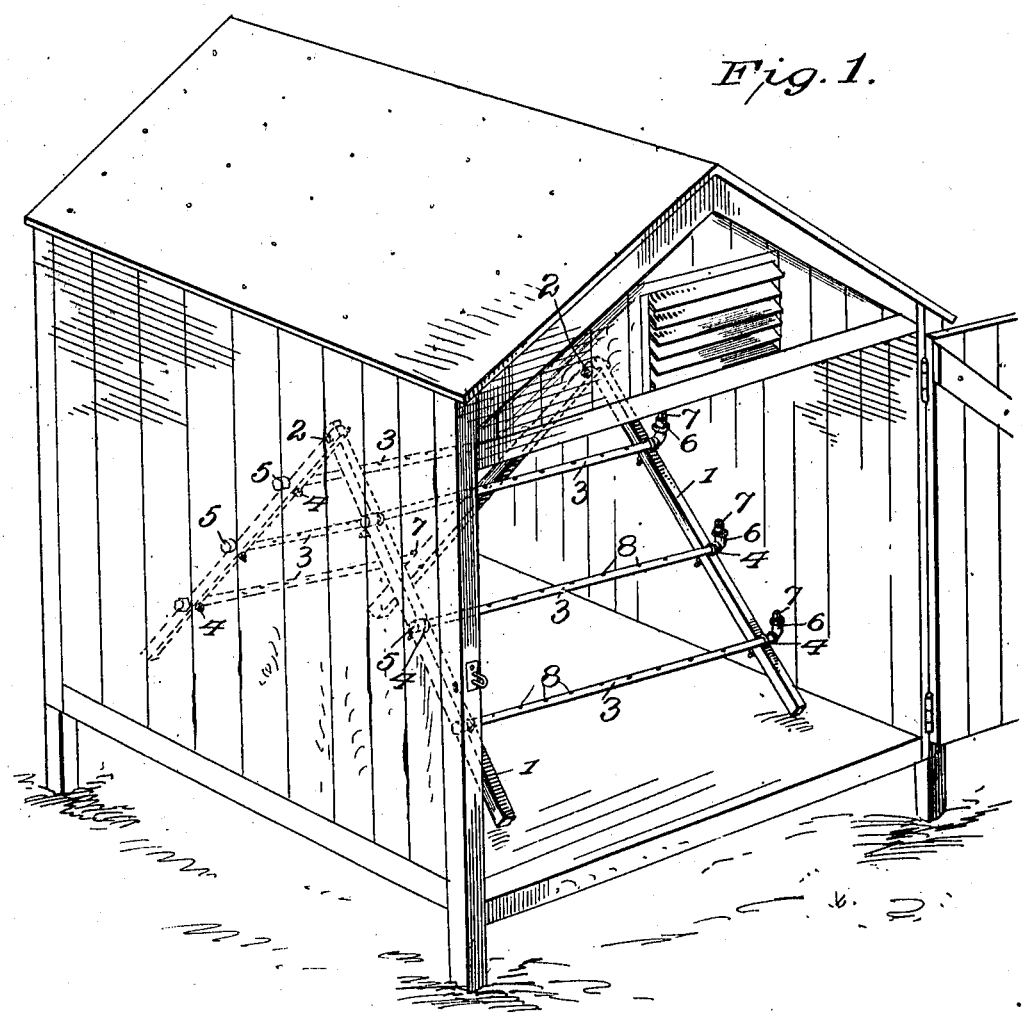
Figure 2:
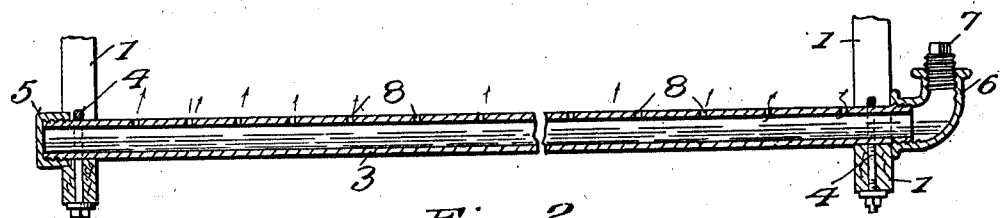

For a full understanding of the invention and the merits thereof and also to acquire a knowledge of the details of construction and the means for effecting the result, reference is to be had to the following description and accompanying drawings, in which:

Figure 1 is a perspective view showing one adaptation of the invention; Fig. 2 is an enlarged sectional view of one of the tubes employed; Fig. 3 is a perspective view of my improved perch; and, Fig. 4 is a side view showing another application of the invention.

Corresponding and like parts are referred to in the following description and indicated in all the views of the accompanying drawings by the same reference characters.

Referring to the drawings, my improved perch comprises two pairs of bars 1 of wood or other material, pivotally connected together at one end by bolts 2, the said pairs being transversely spaced from each other as shown. The bars of one pair are connected to the corresponding bars of the other pair by pipes 3, fastened near their ends to the bars 1 as by hook bolts 4 or other fastening means. One end of each pipe 3 is closed by a screw cap 5 and the opposite end is provided with an elbow 6 and a plug 7, best illustrated in Fig. 2, which may be removed at any time for the introduction of a disinfectant or other vermin exterminator. The pipes 3 are provided intermediate of the bars 1 with small holes as shown at 8. The evaporation of the disinfectant through the holes 8, coming in contact with the fowls will insure the extermination of any vermin. When the disinfectant has entirely evaporated, the pipes may be easily refilled by removing the plugs 7.

In the adaptation of the invention shown in Fig. 4, the perch is shown with one end resting upon the floor and the other extremity fastened against the wall as at 10. This may be found to be a more convenient use of my invention.

It will be clear that this perch, when not in use, may be folded together occupying a minimum space for storage.

As disclosed in the drawings, it will be noted that the pipes 3 are so secured to the bars 1 as to be rotatable thereon. Therefore, as said bars are collapsed or extended, as in Fig. 4 of the drawing for instance, the pipes 3 may be turned so that the apertures 8 will be kept uppermost. In this way the disinfectant or other vermin exterminator, contained in the pipes, will be prevented from spilling or wasting.

Having thus described the invention, what is claimed as new is:

A roost for fowls comprising supporting bars, tubes rotatably mounted thereon and running at right angles to said bars, and bolts extending through the bars and adapted to encircle the tubes near their ends, said tubes being provided intermediate of their ends with apertures and adapted to carry a disinfectant or the like.

In testimony whereof I affix my signature in presence of two witnesses.

GEORGE C. JAMES. [L. S.]

Witnesses:
ALBERT HOLTZ,
HORATIO S. SIMPSON.